Nov. 30, 1943.  J. C. SMITH  2,335,461
METHOD AND APPARATUS FOR STENCILING UPON ARTICLES
Filed Oct. 14, 1940

INVENTOR.
John C. Smith, Deceased
BY Mary Barbara Stevenson and
George H. Campbell, Executors.
BY Wood & Wood ATTORNEYS.

Patented Nov. 30, 1943

2,335,461

UNITED STATES PATENT OFFICE 2,335,461

METHOD AND APPARATUS FOR STENCILING UPON ARTICLES

John C. Smith, deceased, late of Beaver, Pa., by George H. Campbell and Mary Barbara Stevenson, executors, Beaver, Pa., assignors to Solar Laboratories, Beaver, Pa., a corporation of Pennsylvania Application October 14, 1940, Serial No. 361,039

3 Claims. (Cl. 101—114)

This invention relates to the art of decorating articles of manufacture. The invention is disclosed in relation to a process involving the use of a silk screen or like stencil member which is perforated in a given design area and imperforate in the adjacent portions. A supply of coloring material is deposited upon the screen and a squeegee is employed to force some of the coloring material through the design area and onto the article of manufacturing which is being decorated.

At present the screen stencil process of decoration is employed extensively for ornamenting glassware and ceramic bodies with ceramic colors. During relatively recent years the screen stencil process of decoration has found extensive usage in the decoration of ceramic articles and glassware. Ceramic colors are used in such instances; these are mixed with an oily vehicle and with a finely ground glass or so-called "frit." After the decoration of the glass or ceramic article with such a coloring material it is fired at a relatively high temperature and during this period the frit and ceramic color are fused onto the body of the article and, therefore, provide a substantially permanent decoration for it.

One of the principal difficulties encountered in this type of process is the expense which attends the replacement of the worn stencil screens. Finely ground glass and some ceramic colors are of an abrasive nature and, since they are passed through the screen by a squeegee which is rubbed over the surface of the screen, there is substantial deterioration of the screen fabric. For this reason the life of the fabric is considerably less than is desirable. The usual screens are made of silk or tulle and such fabrics are expensive due to the fact that considerable care must be exercised in order that the mesh be even and uniform. Screens of metal fabric and wire mesh have been proposed but these have not been found to be particularly suitable due to the fact that metal screens are even more expensive than those of textile material, and are not in fact capable of withstanding the abrasion to any substantially greater degree.

To avoid these difficulties, one of the principal objects of the present invention has been to provide a process for transferring coloring material through the stencil screen without rubbing upon it directly with the squeegee member.

On the other hand, a problem also exists in respect to the control of the amount of pigment deposited upon the ware from the stencil screen. It is conventional practice at the present time to provide a supply of the coloring material upon the screen surface. This material is usually of a somewhat pasty consistency and does not pass through the screen except when forced through by the squeegee. But when there is a large supply of color more of it is forced through the screen interstices than when the supply is limited, for instance, at some time just before the supply is about to be replenished. This variation causes difficulty in obtaining uniformity in the thickness of the films of the applied designs or in the intensity of the colors of the decoration.

An object of the present invention has been to provide a method for replenishing the color supply upon a screen in increments in order that there be no substantial variation in the reservoir of coloring reposing upon the screen.

The present improvement is disclosed particularly in relation to the application of ceramic colors to glassware bodies and ceramic articles since it is in such uses of the screen process that the problems are most acute. However, it is to be understood that the process is equally adapted to be used in decorating or applying lettering to cloth fabrics and paper and articles made of other types of material.

The present invention, briefly, contemplates the application of a film of color upon a surface of a movable band, for instance, at one side thereof by means of a roller coater, or a doctor blade. The color from this band in turn is transferred to the stencil membrane by bringing the surface of the band on which the color is deposited in contact with the stencil membrane. Pressure is applied against the side of the band which is opposite the stencil membrane to pass the color through the membrane without coming into contact with the membrane itself. Since no substantial movement of the band takes place relative to the membrane no appreciable abrasion or deterioration of the fibres can take place.

The color feed band may be of a rugged material, for instance, canvass or leather or rubber, and it therefore is capable of withstanding the abrasion of the squeegee. But in this respect it will also be noted that even the wearing action of the squeegee on the band is substantially lessened because the abrasive coloring material is not present at the side of the band which the squeegee contacts.

After the passage of the pressure member over the band surface for the application of a given design the band and squeegee may be separated slightly out of contact with each other, and the next successive portion of the band which bears a fresh film of color is moved to a position adjacent the screen for a successive transfer operation. The band to which the film of color is applied may either be a continuous belt with color being applied at one portion of it and removed at another portion, or in the alternative, the band may be arranged to be reciprocated, one portion of it receiving color while another portion is in contact with the screen.

In either instance it will be seen that color is fed from the band to the screen in increments. It is therefore a continuing replenishment of the supply of color at the stencil membrane. By virtue of this feature no substantial variation occurs in the amount of color deposited from the stencil membrane to the ware.

In the following description of the drawing which illustrates a preferred embodiment of the invention, those skilled in the art will readily comprehend the modifications to which it is susceptible.

Figure 1:
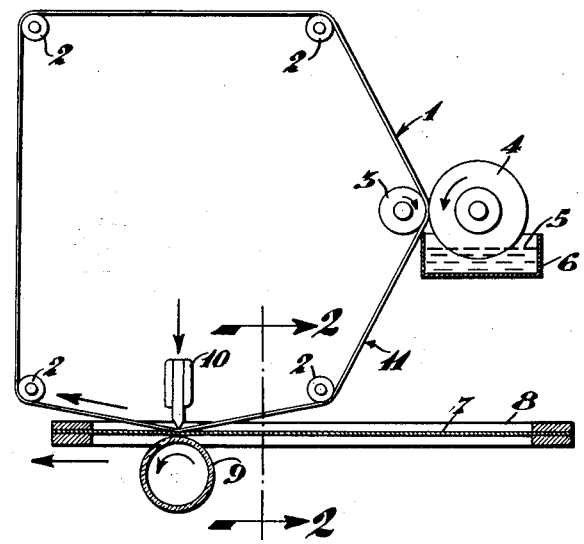
Figure 1 is a sectional view illustrating, somewhat diagrammatically, the application of a film of color to a traveling band and the transfer of the film of color from the band to a stencil member.

In Figure 1, the movable band or web is indicated generally at 1. This member is of a yieldable material; it may be constructed of leather, closely woven fabric, or pliable metal. If fabric is used, it should be of a kind presenting a substantially smooth surface in order that color may be deposited uniformly over all portions of the stencil member.

The band 1 is supported upon the roller members 2, and intermediate a pair of these, the band passes over another roller 3 which cooperates with a coating roller 4. The latter member is positioned so that its outer periphery comes into contact with the supply of coloring material 5, contained in a supply tank 6. As the roller 4 moves through the coloring material, a film of it is picked up on the surface of the roller and is transferred from the roller to the surface of the web.

Another portion of the traveling web is arranged adjacent the stencil member 7 to which color is to be fed. The stencil member may be made in the usual manner, and comprises a convenient stencil screen stretched tightly and held within a frame 8. The screen is movable on guideways (not shown), and a chuck or suitable holding means 9a is provided to support the ware 9 which is being decorated. The screen, as previously described, is perforated in design areas, and as it is moved, the ware revolves to receive the coloring material forced through the screen design areas.

The structure of the screen and the arrangement for bringing the screen into contact with the ware relative to one another for the application of the decoration, form no part of the present invention, and are, therefore, not described in detail. Those skilled in the art will readily understand the various types of structures which are suitable for use.

Figure 3:
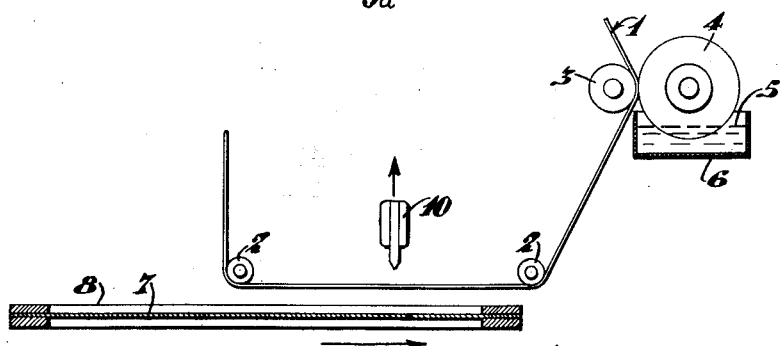
Figure 3 is a fragmentary view, similar to Figure 2, but showing the relationship of the members at the end of the transferring operation.

As shown in Figure 3, it is preferable that the pair of rollers 2, which support the traveling band 1 adjacent the screen stencil, be positioned so that the color band is normally out of contact with the surface of the stencil membrane. The squeegee member, indicated generally at 10, is positioned to engage the side of the web 1 which is opposite the stencil membrane. As the squeegee presses upon the web, it forces it into contact with the stencil screen for the transfer of the coloring material. The web 1 may be slightly elastic to accommodate this lateral movement or, if necessary, one of the rollers 2 may be carried in yieldable journals.

Figure 2:
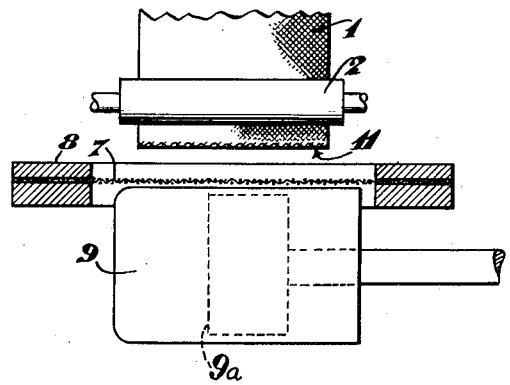
Figure 2 is a sectional view on the line 2—2 of Figure 1.

The width of the band 1 is sufficient to cover that portion of the stencil membrane which is perforated in design areas, as shown in Figure 2.

In the practice of the method, a film of color indicated generally at 11 is applied from the surface of the roller 4 to the surface of the movable web, and the web is then advanced until this film of color is adjacent the stencil membrane, with the piece of the ware to be decorated supported beneath the membrane. The squeegee 10 is depressed so as to bring the web into contact with the screen, and to press the screen along a line of contact with the periphery of the ware. Thus, Figure 1 shows the relationship of the members just after the start of the application of a decoration to the ware, and Figure 3 shows the relationship of the parts during the period in which the stencil membrane is being returned to starting position.

When the squeegee presses the band against the stencil and presses the stencil against the ware, the movement of the stencil causes the ware to be rotated, and at the same time, causes the band to be advanced with the stencil, due to the relative friction between the two. For this reason, it is not necessary to provide a separate advancing mechanism for the traveling web, except in instances where the web is of a heavy material and incapable of being moved by frictional contact with the screen.

At the end of a decorating operation, the squeegee 10 is moved away from the band 1, and the band, therefore, moves out of engagement with the stencil membrane, thereby permitting the work to be removed without danger of smudging, and permitting the stencil membrane to be returned to starting position for a next successive decorating operation.

In certain instances it has been found desirable to hold a blunt edged instrument, such as a scraper, on the surface of the band to which the color is applied at periodic intervals or continuously, as the case may be, so as to remove any unused color which may tend to accumulate and cake or harden upon the band. This procedure can be followed when it is intended to discontinue the use of one color and apply material of a different color to the band.

While the preferred embodiment of the invention has been disclosed in relation to a continuous band, it will be understood that the band may be of the unitary length and arranged to be reciprocated in much the same manner as the stencil screen is moved. In such an instance, the film of color is applied at one portion of the band while another portion is in engagement with the screen, the band being returned for replenishment of its color supply during the period when the supply is being returned to starting position.

The process of the invention also has been disclosed particularly in relation to a stencil screen, that is, a foraminous membrane made of silk or metal fabric. However, the process also is suitable for use in conjunction with a blocked-out stencil, with which a squeegee cannot ordinarily be used for forcing the color through the stencil onto the ware because of the tendency of the squeegee to catch upon the stencil at the openings therein. The band intermediate the stencil and the squeegee protects the former so that a smooth application of color is readily obtained without danger of injuring the stencil member.

What is claimed is:

1. In the art of decorating articles of manufacture, the method of passing color of an abrasive nature through a screen stencil by means of a squeegee without subjecting the stencil to abrasive wear, which comprises depositing a film of the color material upon one surface of a band, advancing the band containing the coloring material to a screen stencil in such manner that the film of color is positioned in meeting relationship to the stencil, pressing along a narrow sharp line of contact upon a surface of the band opposite the surface which contains the coloring material for bringing the coloring material into engagement with the stencil, advancing the band and the stencil in unison for forcing an advancing line-like film of color through the stencil and simultaneously depositing the line-like film of color which is passed through the screen onto the article being decorated.

2. In the art of decorating articles of manufacture, the method of passing color of an abrasive nature through a stencil by means of a squeegee without subjecting the stencil to wear through abrasion, which method comprises depositing a film of the coloring material upon a surface of a band, advancing the band to a stencil for engagement of the film of color thereon with the stencil, pressing upon the opposite surface of the band along a narrow sharply defined line of contact to force the film of color through the stencil and onto ware to be decorated, and advancing the stencil and the ware to be decorated in unison relative to the said line of contact.

3. Apparatus for decorating articles of manufacture, which comprises a chuck for holding the articles to be decorated, a screen arranged to be brought into contact with articles held in the chuck, a band disposed at the side of the screen opposite said chuck and arranged for engagement therewith, means for advancing said band and said screen in unison when they are in contact with one another, means for applying a film of color to that surface of the band which is positioned to meet the stencil, and a squeegee having a substantially line-like edge positioned to exert pressure along a line upon the surface of the band which is opposite the surface at which color is applied, for bringing the band and coloring material thereon into engagement with the screen, and thereby forcing the coloring material through the screen onto the ware along a line.

GEORGE H. CAMPBELL,
MARY BARBARA STEVENSON,
*Executors of the Estate of John C. Smith, Deceased.*